(12) United States Patent
Gransden et al.

(10) Patent No.: US 6,404,970 B1
(45) Date of Patent: Jun. 11, 2002

(54) VARIABLE OPTICAL ATTENUATOR

(75) Inventors: David Gransden, Nepean; Phillipe Lonjoux, Kanata, both of (CA)

(73) Assignee: JDS Uniphase Inc., Nepean (CA)

( * ) Notice: Subject to any disclaimer, the term of this patent is extended or adjusted under 35 U.S.C. 154(b) by 0 days.

(21) Appl. No.: 09/575,620

(22) Filed: May 22, 2000

(51) Int. Cl.[7] ................................................ G02B 6/26
(52) U.S. Cl. ............................. 385/140; 385/19; 385/73
(58) Field of Search ........................... 385/140, 73, 19, 385/25, 116, 120

(56) References Cited

U.S. PATENT DOCUMENTS

| | | | |
|---|---|---|---|
| 3,620,599 A | 11/1971 | Ashkin | 359/572 |
| 4,591,231 A * | 5/1986 | Kaiser et al. | |
| 4,904,044 A | 2/1990 | Tamulevich | 350/96.18 |
| 4,989,938 A | 2/1991 | Tamulevich | 350/96.15 |
| 6,031,666 A | 2/2000 | Nutt et al. | 359/558 |
| 6,040,936 A | 3/2000 | Kim et al. | 359/245 |
| 6,292,616 B1 * | 9/2001 | Tei et al. | 385/140 |
| 6,304,709 B1 * | 10/2001 | Fujita | 385/140 |

* cited by examiner

Primary Examiner—Hemang Sanghavi
(74) Attorney, Agent, or Firm—Neil Teitelbaum

(57) ABSTRACT

A variable optical attenuator of the multiple-aperture type is disclosed. The attenuator comprises a thin element having a plurality of apertures therein. The plurality of apertures is arranged such that the size of most of the apertures increases along a distance of the thin element. In particular, the plurality of apertures is arranged in a carefully designed pattern wherein the percentage of transmitted light varies from one end of the pattern to the other. The variable optical attenuator is substantially wavelength and polarization independent.

24 Claims, 5 Drawing Sheets

VARIABLE OPTICAL ATTENUATOR

FIELD OF THE INVENTION

This invention relates to a variable optical attenuator for controllably attenuating optical signals. In particular, this invention relates to a variable optical attenuator in the form of a graded holes filter that is substantially wavelength independent and substantially polarization independent.

BACKGROUND OF THE INVENTION

There are numerous optical attenuators known in the art. Ideally, an optical attenuator provides means for controlling the intensity of a beam of light without appreciably affecting its other properties.

Traditionally, variable apertures or irises have been used to regulate the cross-section of a beam of light, and hence its total energy content. However, most single aperture attenuators that block a portion of the optical signal are wavelength dependent and polarization dependent, thus limiting the usefulness of these devices in many applications.

Optical attenuators of the wire-grid type are also known and are described, for example, in U.S. Pat. No. 3,620,599 to Arthur Ashkin, hereby incorporated by reference. These type of optical attenuators operate under the principles of diffraction. The wire-grid comprises a plurality of uniformly spaced parallel reflective wires, wherein the wire diameter and spacings therebetween are selected to be one to three orders of magnitude greater than the wavelength of the optical radiation to be attenuated. Variable attenuation is accomplished via rotation of the grid about an axis parallel to said wires. Although, these optical attenuators perform well under high power conditions, numerous problems arise from scattering and/or backreflection, which degrades the quality of the transmission and leads to feedback noise. When these attenuators are close to a laser, the reflections also contribute to reduced laser performance.

More commonly, variable attenuators are continuously variable neutral density filters, wherein optical density is a varying function of position over the area of the filter. These are generally formed from an optical glass substrate with a metallic coating that has a density that increases as it progresses across the surface of the filter. Attenuation is effected by absorption and reflection of the e optical signal as the filter i s moved relative to the optical beam. Generally, the-movement of such a filter is rotation around the axis of the attenuated beam.

A continuously variable fibre optic attenuator wherein the density gradient varies along its length is disclosed in U.S. Pat. No. 4,904,044 to Tamulevich, hereby incorporated by reference. The attenuator uses a flexible filter of varying optical density which is oriented in an optical coupling region between two optical fibres. The filter is displaced in a manner to vary the filter density in the optical coupling region and thereby vary the attenuation across the device. A resistor coupled to the attenuator provides means for calibration of the attenuator to provide a highly accurate and reproducible attenuation.

Although continuously variable neutral density filters perform satisfactorily, they are expensive to manufacture and exhibit some weakness in spectral absorption, reflection, and refraction characteristics.

In particular, since neutral density features exhibit high absorption characteristics the t temperature of the metal coating reaches high levels, thus inducing some wear over time (e.g., delamination, oxidation, annealing, etc.). As a result, the intrinsic characteristics of the filter are affected, e.g. density. Furthermore, disturbances due to interference of the reflected radiation resulting from irregularities on the surface of the filter, are a further limitation, particularly when the temperature of the filter increases, as found in high light intensity applications.

Moreover, the application of the metallic coating requires a high degree of accuracy, and frequently varies from batch to batch. Furthermore, it is extremely difficult to manufacture a neutral density filter wherein the metallic layer is deposited in a manner that produces a substantially linear relationship between attenuation and position of the filter.

It is an object of this invention to provide an optical attenuator that obviates most or all of the above mentioned disadvantages, and that is less complex and less costly to manufacture.

It is yet a further object of the invention to provide an optical attenuator that is substantially wavelength independent, substantially polarization independent, and is useful for high power applications.

SUMMARY OF THE INVENTION

The instant invention provides a variable optical attenuator that is substantially wavelength independent and substantially polarization independent. Similar to optical attenuators of the wire-grid type, the graded holes filter of the instant invention operates under the principles of diffraction. Specifically, zeroth order diffracted light transmitted through the filter provides the wavelength independent attenuated radiation.

In accordance with the invention, there is provided, a variable optical attenuator for attenuating a beam of light comprising an optical signal having a diameter less than about 1 mm, comprising:

a filter comprising a sheet having a plurality of apertures discretely arranged for providing a transmission gradient along a path defining a gradient axis of the sheet, the plurality of apertures having a predetermined shape, size and distribution, and having a length and a distance therebetween that is substantially smaller than the diameter of the beam of light;

an input port for launching the beam of light towards the filter at a predetermined angle;

an output port for receiving substantially focussed light from the filter; and, means for providing relative movement between the beam of light and the filter for effecting variable attenuation of the beam of light in dependence upon a position of said filter relative to said beam of light.

In accordance with the invention there is further provided, a variable optical attenuator for attenuating a beam of light comprising an optical signal having a diameter less than about 1 mm, comprising:

a filter comprising a sheet having a plurality of substantially opaque regions and a plurality of substantially transparent regions discretely arranged thereon such that a percentage of transparent region per unit area increases along a dimension of the filter, the unit area having a diameter equivalent to the diameter of the beam of light, the plurality of substantially transparent regions having a predetermined shape, size and distribution, and at least a portion of the substantially transparent regions having a length and a distance therebetween substantially smaller than the diameter of the beam of light;

an input port for launching the beam of light towards the filter at a predetermined angle;

an output port for receiving substantially focussed light from the filter; and, means for providing relative movement between the beam of light and the filter for effecting variable attenuation of the beam of light in dependence upon a position of said filter relative to said beam of light.

In accordance with the invention there is provided, a method of variably attenuating a beam of light comprising an optical signal having a diameter less than about 1 mm comprising the steps of:

(a) irradiating a filter comprising a sheet having a plurality of substantially opaque regions and a plurality of substantially transparent regions discretely arranged thereon such that a percentage of transparent region per unit area increases along a dimension of the filter, the unit area having a diameter equivalent to the diameter of the beam of light, the plurality of substantially transparent regions having a predetermined shape, size and distribution, and at least a portion of the substantially transparent regions having a length and a distance therebetween substantially smaller than the diameter of the beam of light;

(b) relatively moving the filter and the beam of light for effecting variable attenuation of the beam of light in dependence upon a required degree of attenuation.

BRIEF DESCRIPTION OF THE DRAWINGS

Exemplary embodiments of the invention will now be described in conjunction with the drawings, in which.

DETAILED DESCRIPTION

Figure 1:
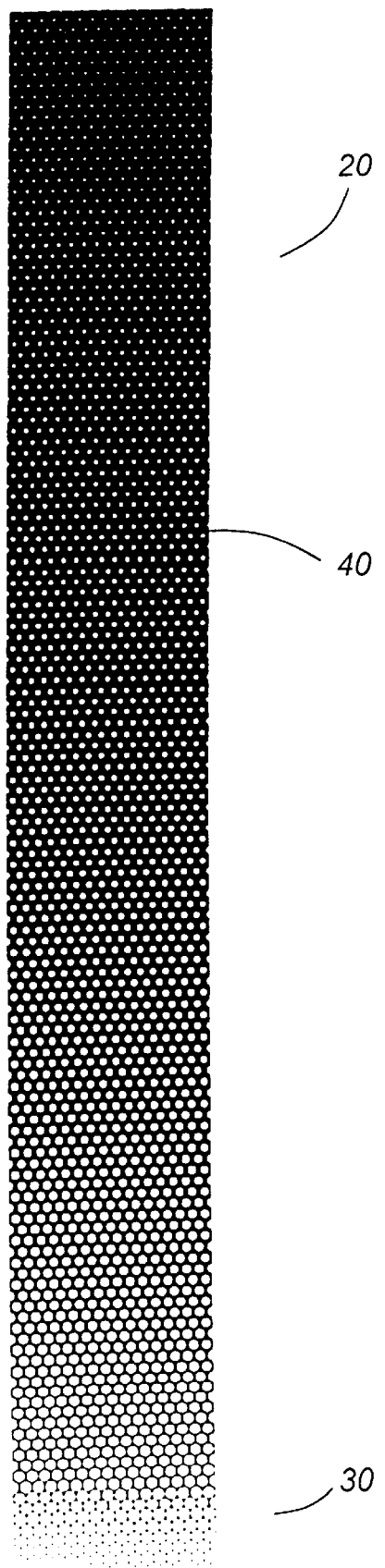
FIG. 1 is a frontal view of the graded holes filter, according to one embodiment of the instant invention.

Referring to FIG. 1, a filter for a variable optical attenuator according to an embodiment of the invention is shown. The filter 10 includes a thin element 40 having a plurality of 'apertures'. The apertures are transparent 'holes' or 'windows' absent the presence of an attenuating material, and having a size that varies along the length of the filter 10. At a high attenuation end 20 of the filter the holes are small and isolated. At the low attenuation end 30 the larger holes overlap for maximum transparency. The result is a graded holes filter, wherein the graded holes provide a transmission gradient along a path defining a gradient axis of the filter, e.g., the longitudinal axis of the filter shown in FIG. 1.

The term 'transmission gradient' as used herein, refers to a gradient or stepping of percent transmission per unit area along a predetermined dimension, for example a dimension defining the gradient axis. The unit area is defined in this exemplary embodiment as a circle having a diameter equivalent to the diameter of the beam of light to be attenuated.

Ideally, the thin element is as thin as possible to avoid phenomena associated with light traveling through narrow 'tubes'. Accordingly, it is preferable that the thin element 40 be a thin film supported on a substrate 50, such as glass. The materials for forming the thin film 40 and substrate 50 are opaque and transparent, respectively, for the wavelength region of interest. In the ideal case, the opaque sections transmit no light, and the transparent sections do not affect the phase of the transmitted light.

For example, the phase of the light transmitted by the transparent sections is affected by the substrate 50, having a constant thickness therethrough, evenly across the beam section with substantially no effect on the wavelength. If light is able to pass through the opaque sections, then waves starting out in phase and transmitted by the opaque and transparent sections, respectively, will have a relative phase difference generating wavelength dependence. Accordingly, it is important to reduce the amount of transmitted light by the opaque sections and to maintain the thickness of the opaque regions constant, particularly at the edge of the apertures.

It is also preferred that the thin film 40 be highly reflective, although an absorbing material may be suitable for some applications. The thin film is produced from any appropriate material. In particular, gold is exceedingly suitable due to its high reflectivity, durability, and ease of application when applied in very thin layers.

The shape, size and distribution of the holes are predetermined according to the application. In general, the shape of the individual holes are designed to reduce polarization problems, and the spacing is designed for controlling the diffracted and/or reflected light. With respect to the former point, symmetric cyclic shapes do not generally introduce the same polarization problems as do long narrow slits. With respect to the latter, the holes are typically close together for controlling back reflection by spreading the reflected diffraction pattern. However, reducing back reflection is a potentially complex problem. Both the hole size and the hole spacing should be selected in dependence upon the filter angle (FIG. 2) for controlling back reflection.

Figure 4A:
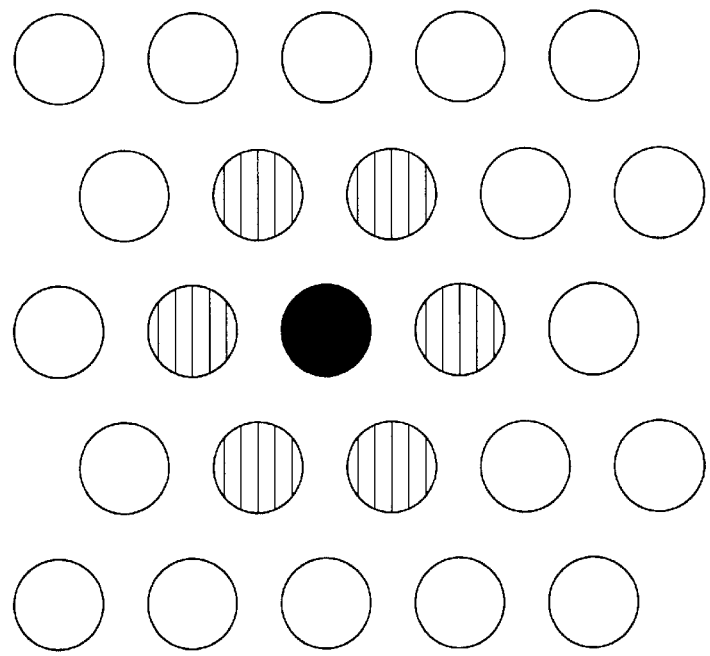
FIG. 4a is a schematic diagram of a central aperture having six closest neighbors.
Figure 4B:
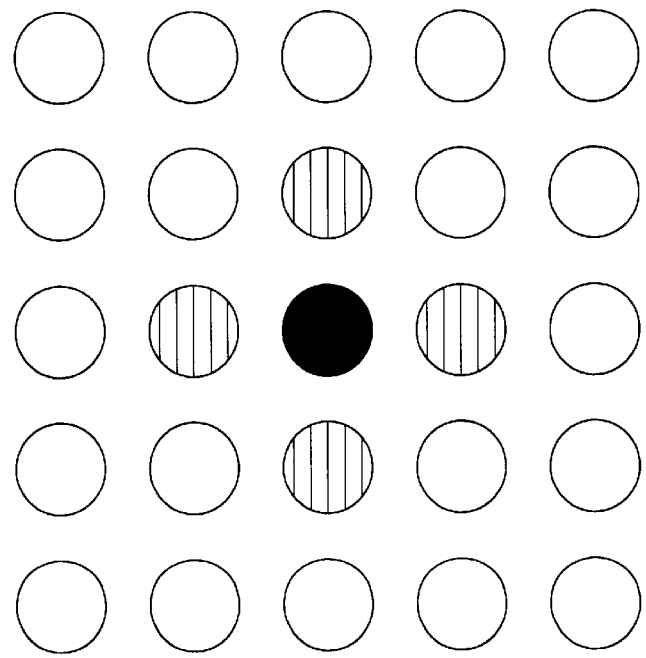
FIG. 4b is a schematic diagram of a central aperture having four closest neighbors.

According to FIG. 1, the holes have a circular shape and a uniform distribution. The distribution pattern is designed to minimize spacing between neighboring apertures. Specifically, each aperture is designed to have six closest neighbours, i.e., for each central aperture there are six neighboring apertures having equivalent centre-to-centre distances from said central aperture. For example, compare FIG. 4a and 4b, which illustrate the presence of six and four nearest neighbours, respectively. In general, the spacing between holes is between about 1 to 100 μm. For spacings about 40 μm, it is likely that at least some of the holes will have an area of at least about 500 μm².

Of course, other shapes and/or patterns are equally possible. For example, circular, oval, triangular, square, diamond, hexagon, and/or other polygonal shapes are likely suitable, in for example, honeycomb (FIG. 4a), checkerboard (FIG. 4b), or other arrangements. Alternatively, the distribution is substantially random, while still providing an smooth transmission gradient along the gradient axis.

The size and spacing of the holes is of particular. importance to the instant invention. A certain level of quality is required in forming the thin film 40. Preferably, flaws within the pattern are smaller than the wavelength of light to be attenuated, so as to not affect the light. In practice, there is the possibility that the very small holes have defects that are significant relative to their size. If the thin film 40 has a significant thickness, it is preferable for the same to be constructed with straight edges.

In each of the embodiments described herein, it is preferred that the holes are substantially larger than the wavelength of light to be attenuated, that the distribution is such that there are many holes for a given cross-section of a beam of light, and that the beam of light is attenuated to various degrees depending upon the position of the filter therein. Preferably, there is a linear relationship between the degree of attenuation and the position of the filter. Notably, the apertures are absent the presence of any material or coating that affects the light transmitted therethrough.

Although the filter 10, as described heretofore, is described as including a thin film having a plurality of holes or apertures therein, it is noted that it is equally well described as including a transparent substrate having a discrete plurality of substantially opaque and substantially transparent regions on a surface thereof. The latter description accounts for the fact that the 'holes' are not visually evident as such at the low attenuation end 30 of the filter, and supports an embodiment of the instant invention wherein the thin film is applied to a surface of the transparent substrate. For example, the thin film is 'painted' or 'sputtered' onto a surface of the transparent substrate in a predetermined pattern. The plurality of transparent regions corresponds to a plurality of light transmissive windows absent the presence of an attenuating material. In accordance with the latter description, the plurality of substantially transparent regions and substantially opaque regions are arranged such that a percentage of transparent region per unit area increases along a distance of the filter, wherein the size of the unit area is selected to be large enough to encompass at least the largest transparent region, and wherein at least a portion of the substantially transparent regions have a length and a distance therebetween substantially smaller than the diameter of the beam of light to be attenuated.

The optical attenuator further includes means 110 for moving the filter 10 within a beam of light. For example, an automated feedback system could be constructed to correlate the position of the filter with the appropriate attenuation. Alternatively, an actuator 110 is provided to step the position of the filter accordingly.

Figure 2:
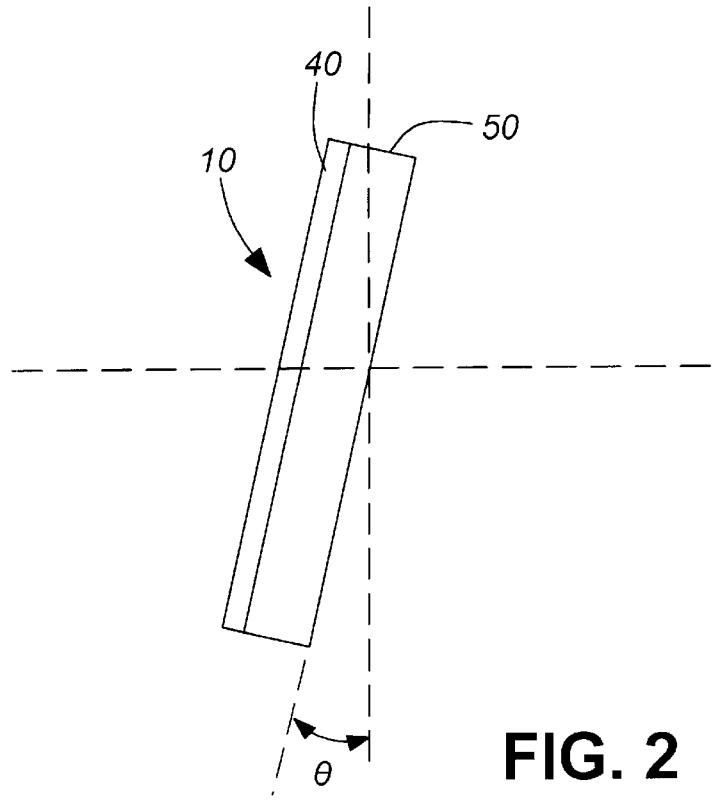
FIG. 2 is a side cross-sectional view of the graded holes filter.

In operation, the filter 10 is positioned along an optical path, denoted with dotted lines in FIG. 2, at a carefully planned angle, θ. The angle θ, which varies from −80 to 80°, is selected according to the application. For example, in most instances the angle is under a few degrees, but extends up to 45° in applications where it is desirable to direct the reflected radiation entirely away from the source.

The filter 10 is positioned such that the frontal reflective surface faces an oncoming beam of light. Specifically, the filter 10 is positioned such that a cross-section of the beam of light overlays at least a portion of the filter. Preferably, the beam of light is collimated, however, this is not necessary.

As the beam of light strikes an aperture, or more generally the thin film 40 having a plurality of apertures, a portion of the light is transmitted and the remaining portion is reflected. The transmitted light is diffracted, in accordance with well known optical principals. The diffraction pattern of the transmitted light includes a bright central 'zero order' spot surrounded by higher order spots. The angular width of the diffraction pattern varies inversely with the diameter of the apertures. The transmitted, substantially wavelength independent, zero order beam corresponds to the desired attenuated radiation.

As the filter is moved in a direction parallel to the gradient axis or perpendicular to the optical path, the percentage of transmitted light varies from between 100% at the low attenuation end 30 to less than 0.1% at the high attenuation end 20, in dependence upon the size and distribution pattern of the holes. Specifically, the degree of attenuation is dependent upon the pattern of holes in the path of the light beam. For example, to obtain 30 dB of attenuation the holes in that region will have to cover 3.1% of the area, or be 5.6 times smaller than the distance between them.

The graded holes filter as described heretofore is suitable for many applications. In particular, it is highly suitable in the field of fibre optics wherein the durability, high power capabilities, and substantial wavelength independence of the filter are highly advantageous.

Figure 3:
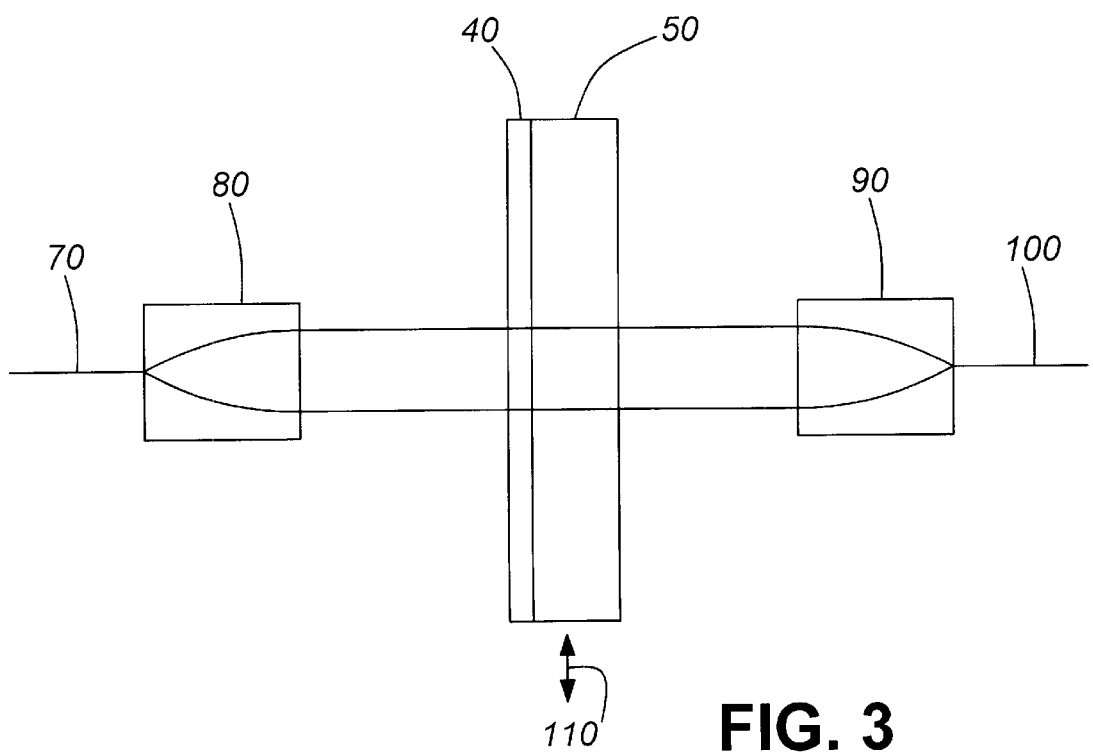
FIG. 3 is a side cross-sectional view of the graded holes filter disposed between two optical waveguides.

For exemplary purposes, consider the graded holes filter illustrated in FIG. 3. A first input optical waveguide 70 provides an input signal (for example a telecommunication signal) to a collimating lens 80, which in turn provides a collimated beam of light to the filter 10. The zero order light that is transmitted through the filter 10 is focussed with a focussing lens 90 onto an end of a second output optical waveguide 100. Means 110 for moving the filter 10 within the beam of light controls the desired attenuation. In general, the collimated beam of light will have a diameter that is less than about 1 mm.

Figure 5A:
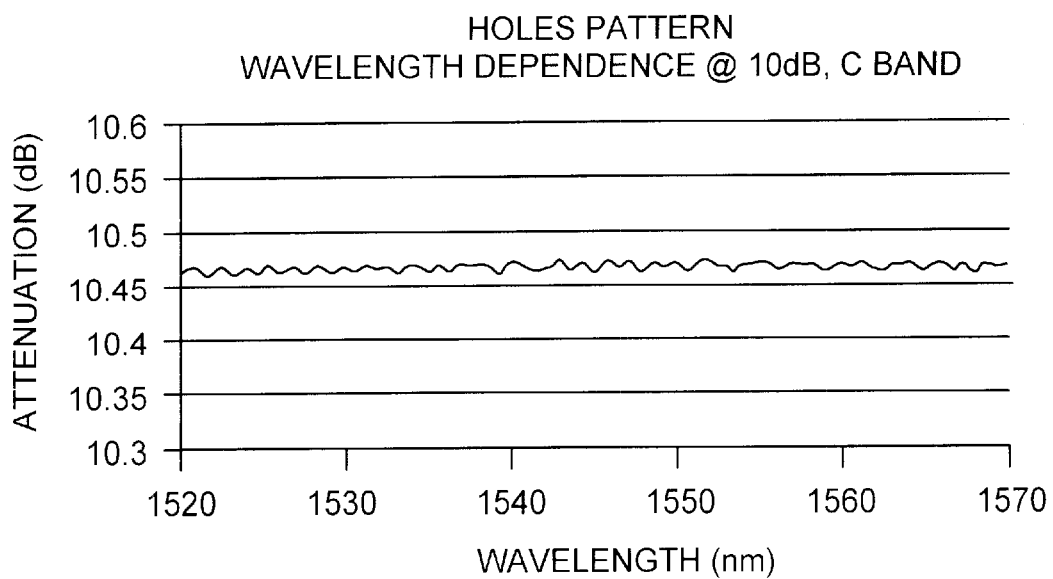
FIG. 5a is a graph showing the wavelength dependence of attenuation at 10 dB.
Figure 5B:
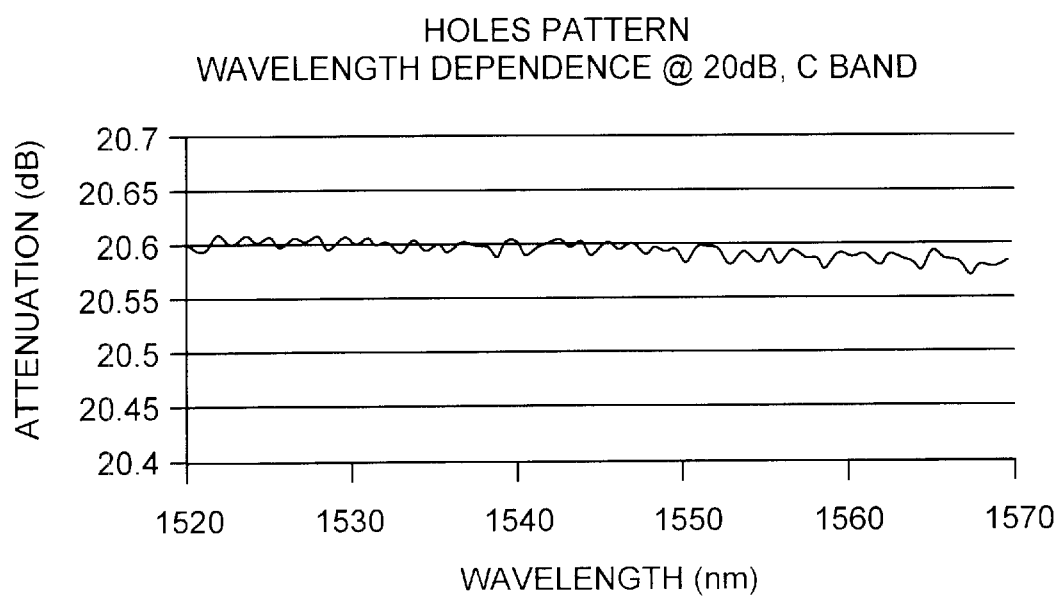
FIG. 5b is a graph showing the wavelength dependence of attenuation at 20 dB.
Figure 6:
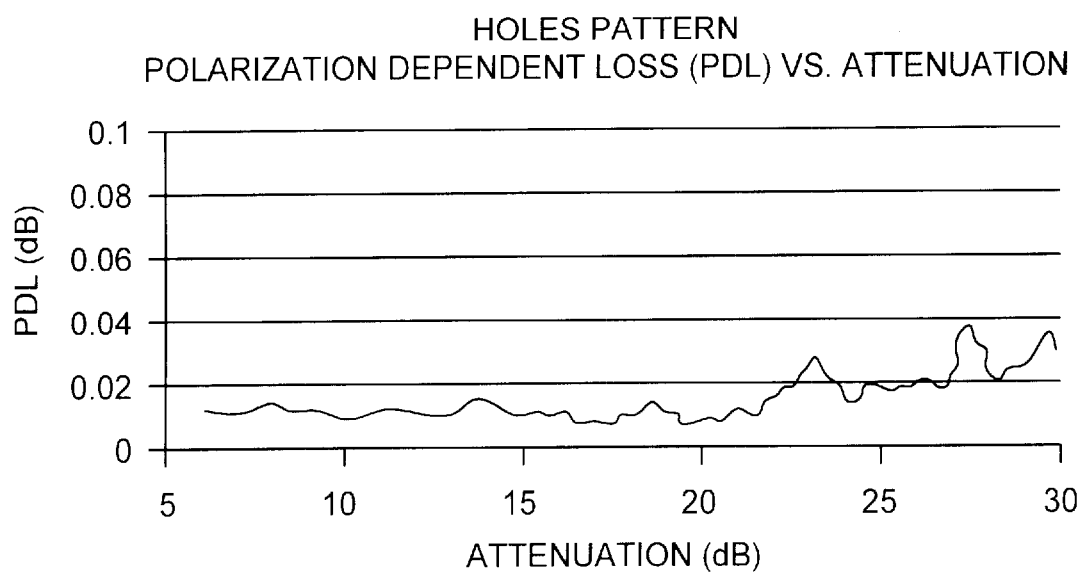
FIG. 6 is a graph of polarization dependent loss versus attenuation.
Figure 7:
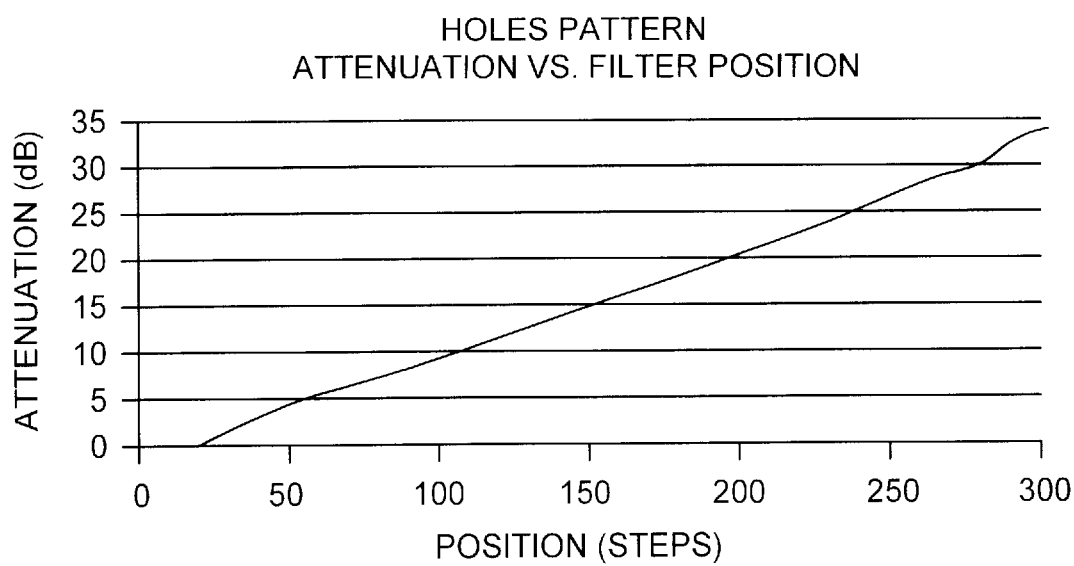
FIG. 7 is a graph of attenuation versus position of the filter.

Selected results of prototype measurements using various graded holes filters mounted in a JDSU HA9 type attenuator manufactured by JDS Uniphase of Nepean Ontario, are provided in FIGS. 5–7, wherein FIGS. 5a and 5b show the relationship between attenuation and wavelength, FIG. 6 shows the relationship between polarization dependent loss and attenuation, and FIG. 7 shows the relationship between attenuation and position of the filter.

The observed linearity with respect to wavelength dependence and polarization dependent loss, each contributes to the exceptional performance of the graded holes filter.

In another embodiment of the instant invention, the thin film is covered with another glass substrate or is disposed within a thick piece of glass. This embodiment has the added advantage of removing any sensitivity of the attenuator to dust or other obstructions. Specifically, the outer glass prevents dust from settling directly on the surface of the film. Dust settling on the outer glass creates a shadow, which is diffracted to cover many holes. Furthermore, in this embodiment the apertures are filled with a transparent glue or another transparent substance, e.g., another protective layer.

In another embodiment, the filter is constructed with various shapes. For example, the filter is constructed to be round, the graded holes forming an annular gradient. The degree of attenuation is varied by rotating the filter.

In yet another embodiment of the instant invention, the size of the holes does not vary. Variable attenuation is accomplished because the distribution pattern is such that the number of holes per unit area varies along a distance of the filter.

In yet another embodiment, more than one graded holes filter is positioned in the path of the optical beam to increase the attenuation. Alternatively, the optical arrangement allows the optical beam to pass through the filter more than once to increase the degree of attenuation.

In summary, the advantages of the graded holes filter are numerous. The filter is highly durable and performs well in high power applications. In an embodiment described heretofore, where the filter is highly reflective in its non-tranmissive regions, the filter is tolerant to high power light incident upon it substantially preventing absorption of this light. Moreover, small changes to the filter as a result of increased temperature do not significantly change the performance of same.

In manufacturing, the costs are reasonable and repeatability is high. Furthermore the filter performs well over a wide spectral range.

Moreover, the instant invention provides a simple filter suitable in high-power applications and which is substantially wavelength insensitive. Specifically, proper dimensioning of the size, shape, and spacing of the holes, and the thickness of the thin film produces a filter wherein the attenuation is substantially independent upon wavelength and/or polarization of the incident radiation.

Of course, numerous other embodiments may be envisaged, without departing from the spirit and scope of the invention. For example, a filter having any combination of varying size, shape, spacing and/or distribution of apertures is possible.

What is claimed is:

1. A variable optical attenuator for attenuating a beam of light comprising an optical signal having a diameter less than about 1 mm, comprising:
    a filter comprising a sheet having a plurality of apertures discretely arranged for providing a transmission gradient along a path defining a gradient axis of the sheet, the plurality of apertures having a predetermined shape, size and distribution, and having a length and a distance therebetween that is substantially smaller than the diameter of the beam of light;
    an input port for launching the beam of light towards the filter at a predetermined angle;
    an output port for receiving substantially focussed light from the filter; and,
    means for providing relative movement between the beam of light and the filter for effecting variable attenuation of the beam of light in dependence upon a position of said filter relative to said beam of light.

2. A variable optical attenuator as defined in claim 1 wherein the sheet comprises a low attenuation end and a high attenuation end, the low attenuation end and high attenuation end disposed at opposite ends of the gradient axis.

3. A variable optical attenuator as defined in claim 2 wherein the apertures are openings absent the presence of an attenuating material.

4. A variable optical attenuator as defined in claim 3 wherein at least one of the apertures has an area greater than about 500 $\mu m^2$.

5. A variable optical attenuator as defined in claim 3 wherein the apertures have a uniform distribution.

6. A variable optical attenuator as defined in claim 5 wherein each aperture has a substantially same shape.

7. A variable optical attenuator as defined in claim 6 wherein the substantially same shape is circular.

8. A variable optical attenuator as defined in claim 7 wherein the size of the apertures increases from the high attenuation end to the low attenuation end.

9. A variable optical attenuator as defined in claim 8 wherein each aperture has six neighbouring apertures, each neighboring aperture having an equivalent centre-to-centre distance thereto.

10. A variable optical attenuator as defined in claim 9 wherein the sheet is a metallic film.

11. A variable optical attenuator as defined in claim 10 wherein the filter comprises a transparent substrate for supporting the metallic film.

12. A variable optical attenuator as defined in claim 11 wherein the metallic film is highly reflective.

13. A variable optical attenuator as defined in claim 12 wherein the metallic film is gold.

14. A variable optical attenuator as defined in claim 13 wherein the metallic film is deposited on the transparent substrate proximate the low attenuation end in a discontinuous and predetermined arrangement for providing an extension of the transmission gradient to a lowest attenuation end.

15. A variable optical attenuator as defined in claim 14 wherein the transmission gradient extends from 0.1% transmissivity at the high attenuation end to 100% transmissivity at the lowest attenuation end.

16. A variable optical attenuator as defined in claim 15 comprising a collimating lens optically coupled to the input port for collimating the beam of light before it reaches the filter and a focussing lens optically coupled to the collimating lens for focussing zeroth order light diffracted from the filter onto the output port.

17. A variable optical attenuator for attenuating a beam of light comprising an optical signal having a diameter less than about 1 mm, comprising:
    a filter comprising a sheet having a plurality of substantially opaque regions and a plurality of substantially transparent regions discretely arranged thereon such that a percentage of transparent region per unit area increases along a dimension of the filter, the unit area having a diameter equivalent to the diameter of the beam of light, the plurality of substantially transparent regions having a predetermined shape, size and distribution, and at least a portion of the substantially transparent regions having a length and a distance therebetween substantially smaller than the diameter of the beam of light;
    an input port for launching the beam of light towards the filter at a predetermined angle;
    an output port for receiving substantially focussed light from the filter; and, means for providing relative movement between the beam of light and the filter for effecting variable attenuation of the beam of light in dependence upon a position of said filter relative to said beam of light.

18. A variable optical attenuator as defined in claim 17 wherein the sheet is a transparent substrate and the substantially transparent regions are apertures absent the presence of a material on a portion of a surface of the transparent substrate proximate at least one substantially opaque region.

19. A variable optical attenuator as defined in claim 18 wherein the plurality of substantially opaque regions is a film deposited on another portion of the surface of the transparent substrate.

20. A variable optical attenuator as defined in claim 19 wherein the optical signal is a telecommunication signal.

21. A method of variably attenuating a beam of light comprising an optical signal having a diameter less than about 1 mm comprising the steps of:
    (a) irradiating a filter comprising a sheet having a plurality of substantially opaque regions and a plurality of substantially transparent regions discretely arranged thereon such that a percentage of transparent region per unit area increases along a dimension of the filter, the unit area having a diameter equivalent to the diameter of the beam of light, the plurality of substantially transparent regions having a predetermined shape, size and distribution, and at least a portion of the substantially transparent regions having a length and a distance therebetween substantially smaller than the diameter of the beam of light;

(b) relatively moving the filter and the beam of light for effecting variable attenuation of the beam of light in dependence upon a required degree of attenuation.

22. A method as defined in claim 21 comprising the step of orientating the filter at a predetermined angle such that a first portion of the light is reflected therefrom and a second portion of the light passes through the plurality of apertures and is diffracted in a diffraction pattern having zero and higher order spots.

23. A method as defined in claim 22 comprising the further step of collecting the zero order diffracted light.

24. A method as defined in claim 23 wherein the zero order diffracted light is substantially wavelength independent.

* * * * *